United States Patent
Koseki et al.

[11] Patent Number: 6,155,886
[45] Date of Patent: Dec. 5, 2000

[54] ELECTRICAL CONNECTOR AND METHOD FOR MAKING THE SAME

[75] Inventors: Yoshitsugu Koseki; Takashi Sato, both of Nagano, Japan; Guan-Fu Huang, Tu-Chen, Taiwan

[73] Assignee: Hon Hai Precision Ind. Co., Ltd., Taipei Hsien, Taiwan

[21] Appl. No.: 09/397,909

[22] Filed: Sep. 17, 1999

[30] Foreign Application Priority Data

Jun. 24, 1999 [TW] Taiwan .................................. 88110668

[51] Int. Cl.7 .................................................. H01R 13/405
[52] U.S. Cl. .......................................................... 439/736
[58] Field of Search ................................ 439/736, 606, 439/636, 637, 65

[56] References Cited

U.S. PATENT DOCUMENTS

| 5,176,541 | 1/1993 | Mori | 439/736 |
|---|---|---|---|
| 5,639,248 | 6/1997 | Yagi | 439/74 |
| 5,641,290 | 6/1997 | Yagi | 439/74 |
| 5,772,474 | 6/1998 | Yagi et al. | 439/736 |
| 5,779,505 | 7/1998 | Yagi et al. | 439/736 |
| 5,842,875 | 12/1998 | Yagi | 439/74 |
| 6,010,370 | 1/2000 | Aihara et al. | 439/736 |

*Primary Examiner*—Gary F. Paumen
*Attorney, Agent, or Firm*—Wei Te Chung

[57] ABSTRACT

An electrical connector comprises an insulative housing having a pair of side walls upwardly extending from a base thereof, and a plurality of terminals insert molded within the housing. Each terminal comprises an end portion engaging with the corresponding side wall, a straight contact portion exposed on an inner side of the corresponding side wall, a retention portion embedded in the housing, and a solder tail outwardly extending from the housing. A method is disclosed to make the electrical connector described above.

7 Claims, 8 Drawing Sheets

ELECTRICAL CONNECTOR AND METHOD FOR MAKING THE SAME

BACKGROUND OF THE INVENTION

1. Field of the Invention

The present invention relates to an electrical connector, and more particularly to an electrical connector having a plurality of terminals securely retained therein. A method is also disclosed to make the connector described.

2. Description of Prior Art

Electrical connectors are used in a variety of applications. One type of connector is commonly known as a board-to-board connector for interconnecting two circuit boards. A board-to-board connector typically includes interengageable male and female connectors. The female connector typically comprises a slot for connecting with a central mating portion of the male connector. A plurality of terminals is arranged within the slot with a longitudinal spacing therebetween known as the "pitch".

To promote miniaturization, compact connectors are desirable. The pitch of the terminals is reduced from 0.635 mm to 0.5 mm and the housing is increasingly thin. A conventional method for forming an electrical connector is to press fit a plurality of terminals in a molded housing. A problem with such a method is that the terminals tend to deform and deflect due to an excessive assembly force during the press fitting process. Since the housing is formed to be extremely thin, damage may be caused to the housing. In addition, since solder tails of the terminals are held by fixture during press-fit process, coplanarity of the solder tails is negatively influenced thereby adversely affecting soldering and electrical connection.

Accordingly, an insert molding method is employed to make small pitch connectors. The terminals are inserted into a mold and retained in a predetermined order within the mold. A housing is molded around the terminals from an insulative material such as plastic to form a connector. Such an insert-molded connectors are disclosed in U.S. Pat. Nos. 5,176,541; 5,639,248; 5,641,290; 5,772,474; 5,779,505 and 5,842,875. One problem with such an insert molding process is that the terminals tend to deflect due to high pressure exerted thereon by injected molten plastic. As a result, the terminals are not reliably fixed in the mold. Thus, a mold which securely retains the terminals in position is desired.

SUMMARY OF THE INVENTION

Accordingly, one object of the present invention is to provide an insert-molded electrical connector having terminals securely retained in a housing thereby obviating deformation and deflection of the terminals.

Another object of the present invention is to provide a method for forming an insert-molded connector for securely retaining terminals in a mold during an injecting process thereby ensuring precise terminal pitch.

A further object of the present invention is to provide a mold which securely retains terminals in position during molding.

In order to achieve the objects set forth, an insert-molded electrical connector in accordance with the present invention comprises an insulative housing and a plurality of terminals securely retained in the housing. The housing has a base and a pair of opposite side walls upwardly extending from the base. Each terminal comprises a straight contact portion, an end portion on one end thereof engaging with the corresponding side wall, a solder tail on the other end thereof, and a retention portion securely embedded in the housing interconnecting the straight contact portion and the solder tail. The retention portion has barbs formed on opposite sides thereof. The solder tail has a transient section interconnecting the retention portion and the solder tail.

A method for forming an insert-molded connector is provided according to the present invention. Such a method is accomplished by a mold assembly having a lower mold, a pair of identical side molds and an upper mold. Two rows of stamped and formed terminals attached to carrier strips are provided prior to molding. The side molds are symmetrically disposed on the lower mold with the two rows of terminals being sandwiched therebetween in a back-to-back relationship.

The lower mold has a plurality of strips formed on an upper surface thereof and arranged in two arrays proximate opposite sides thereof. Each side mold comprises a central portion having a plurality of spaced engaging ribs and a lower portion having a plurality of spaced engaging fingers. Each pair of adjacent engaging fingers is spaced from each other a distance substantially equal to the width of the strips of the lower mold. The tail portions of the terminals are sandwiched between the corresponding engaging fingers and the lower mold thereby preventing vertical movement of the solder tails during molding. The strips of the lower mold are disposed between the engaging fingers of the side molds for abutting against barbs of the retention portions of the terminals thereby preventing the solder tails from moving in a longitudinal direction of the mold assembly. Thus, the solder tails of the terminals are securely retained in the mold assembly in two directions.

The straight contact portions of the terminals are supported by the adjacent engaging ribs of the side molds for preventing movement thereof in a longitudinal direction of the mold assembly during molding thereby ensuring a precise pitch of adjacent terminals.

The upper mold is then lowered onto the side molds. The upper mold comprises a protruding portion disposed between the opposite rows of the straight contact portions of the terminals and two rows of engaging posts formed adjacent to opposite sides of the protruding portion. The end portions of the terminals are sandwiched between the corresponding engaging posts and a side surface of the protruding portion thereby preventing the end portions from moving in a transverse direction of the mold assembly during mold. Thus, the terminals are securely retained in the mold assembly at the end portions, the straight contact portions and the solder tails. Molten plastic is then injected into the mold assembled to form the connector.

Other objects, advantages and novel features of the invention will become more apparent from the following detailed description when taken in conjunction with the accompanying drawings.

DETAILED DESCRIPTION OF THE INVENTION

Figure 1:
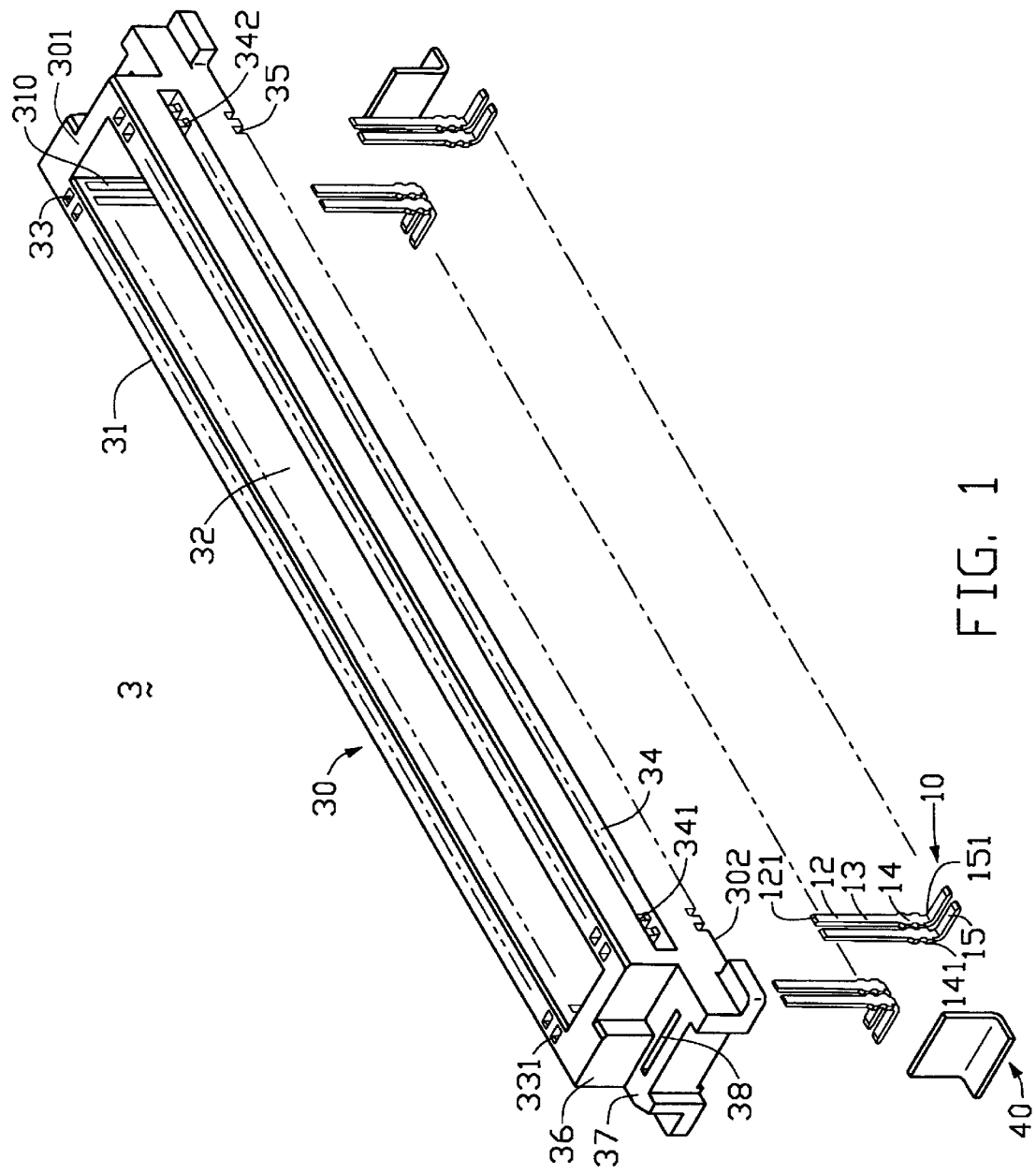
FIG. 1 is an exploded view of an electrical connector in accordance with the present invention.

Reference will now be made to the drawing figures to describe the present invention in detail.

Figure 2:
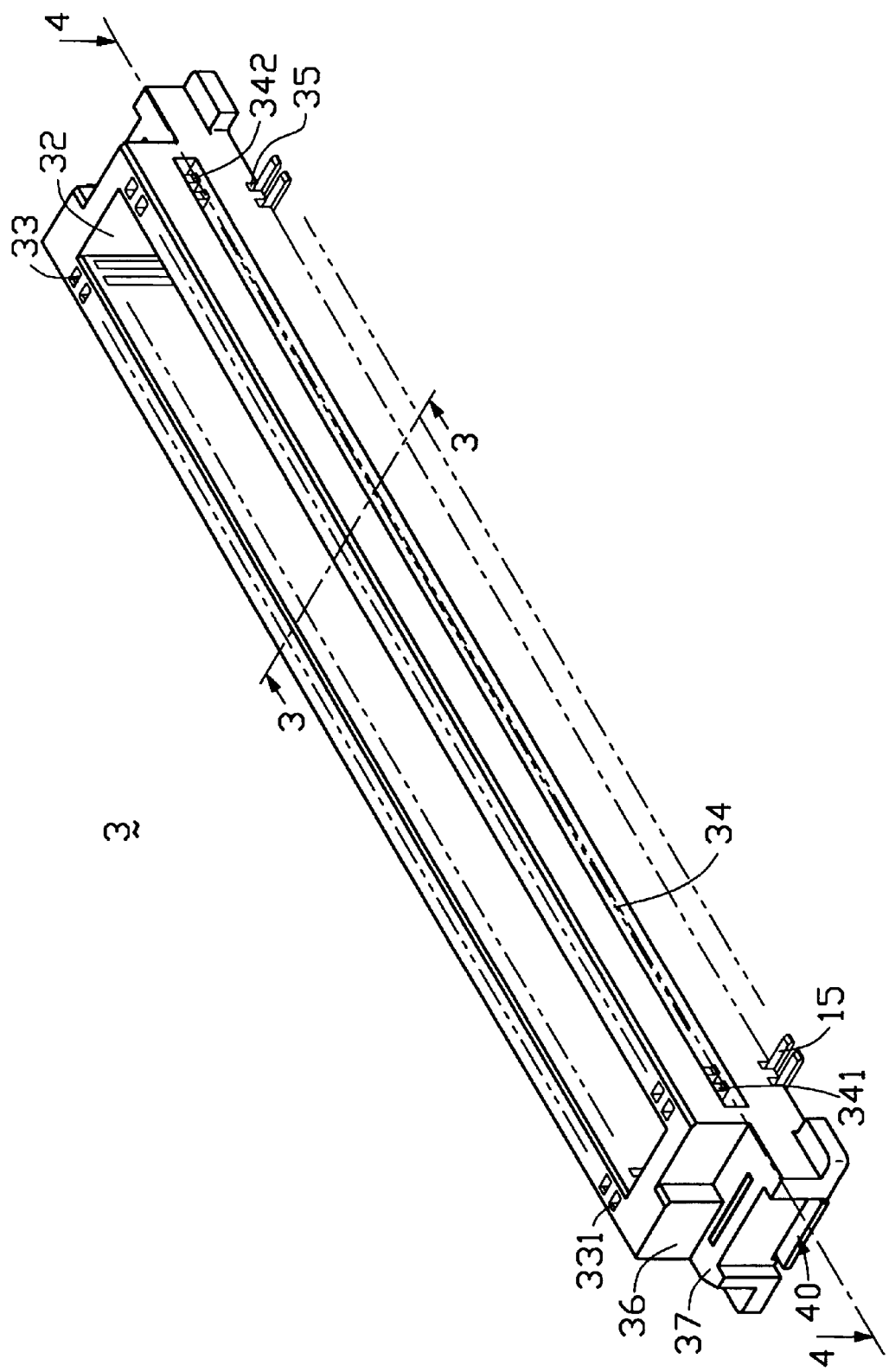
FIG. 2 is an assembled view of FIG. 1.

Referring to FIGS. 1 and 2, an electrical connector 3 in accordance with the present invention comprises an insulative housing 30, a plurality of terminals 10 received in the housing 30, and a pair of solder pads 40 retained in the housing 30. The housing 30 has an upper mating surface 301 for mating with a complementary connector (not shown) and a lower connecting surface 302 for connecting to a first circuit board (not shown). The complementary connector is connected with a second circuit board (not shown). Thus, the first and second circuit boards are electrically connected via the connector 3 and the complementary connector.

The housing 30 comprises a base 39 (FIG. 3) and a pair of opposite side walls 31 upwardly extending from the base 39. An elongate slot 32 is defined between the side walls 31 for receiving a central mating portion (not shown) of the complementary connector. Each side wall 31 results in a plurality of passageways 310 in an inner surface thereof after terminals 10 are removed therefrom. A pair of end portions 37 is formed on opposite ends of the housing 30. Each retention block 37 defines a through hole 38 for receiving the corresponding solder pad 40. Each solder pad 40 is made from metal and functions as a retention member and a grounding member when soldered to the first circuit board. A protrusion 36 is formed on each retention block 37 for guiding engagement of the complementary connector.

Each terminal 10 sequentially comprises an end portion 12, a straight contact portion 13 for mating with a complementary contact of the complementary connector, a retention portion 14 with barbs 141 formed thereon for engaging with the housing 30, and a horizontal solder tail 15 for being soldered to the first circuit board. A tapered section 121 is formed on a free end of the end portion 12 for engaging with the side wall 31. A transient section 151 interconnects the retention portion 14 and the solder tail 15.

Figure 3:
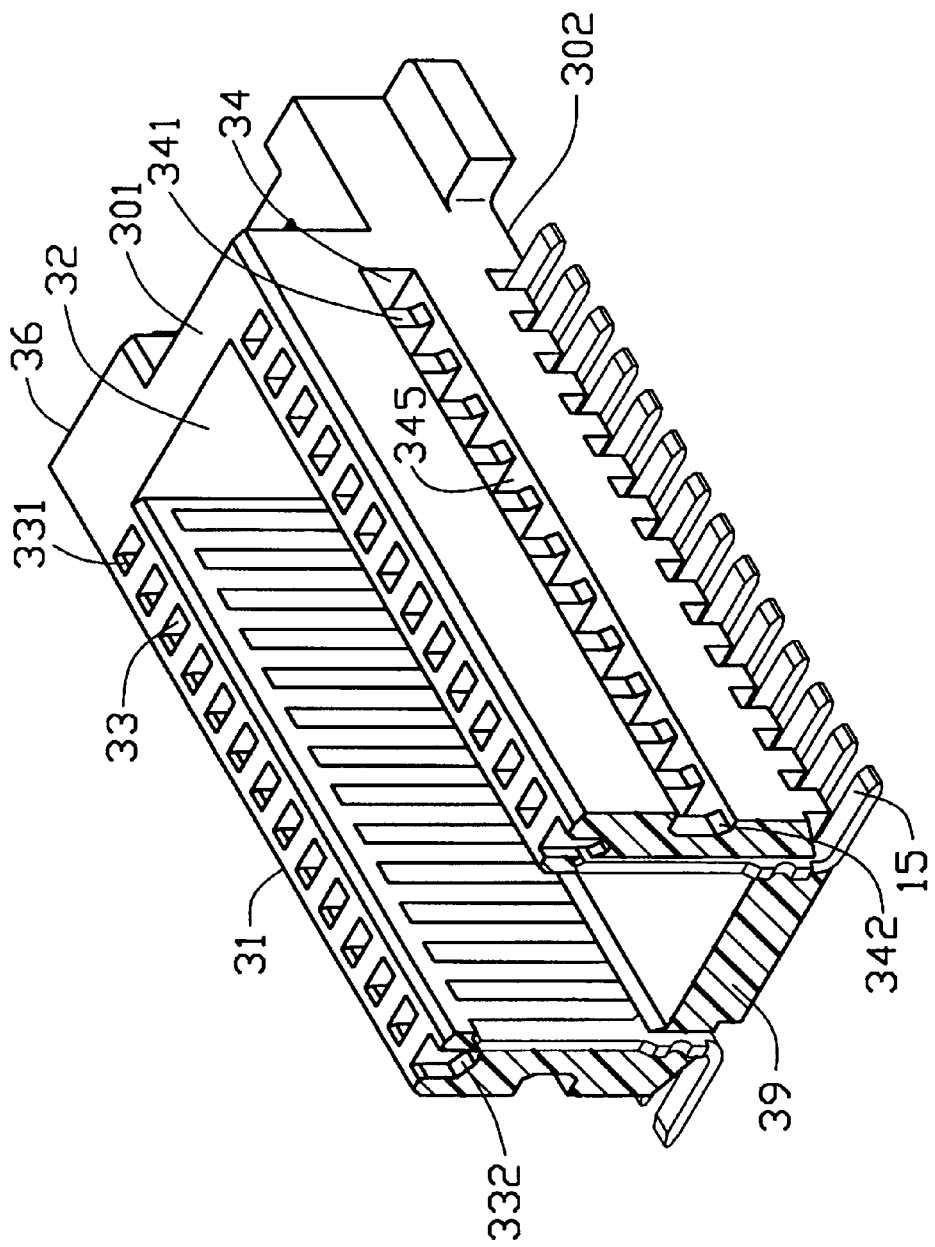
FIG. 3 is a perspective, cross-sectional view taken along line 3—3 of FIG. 2.
Figure 4:
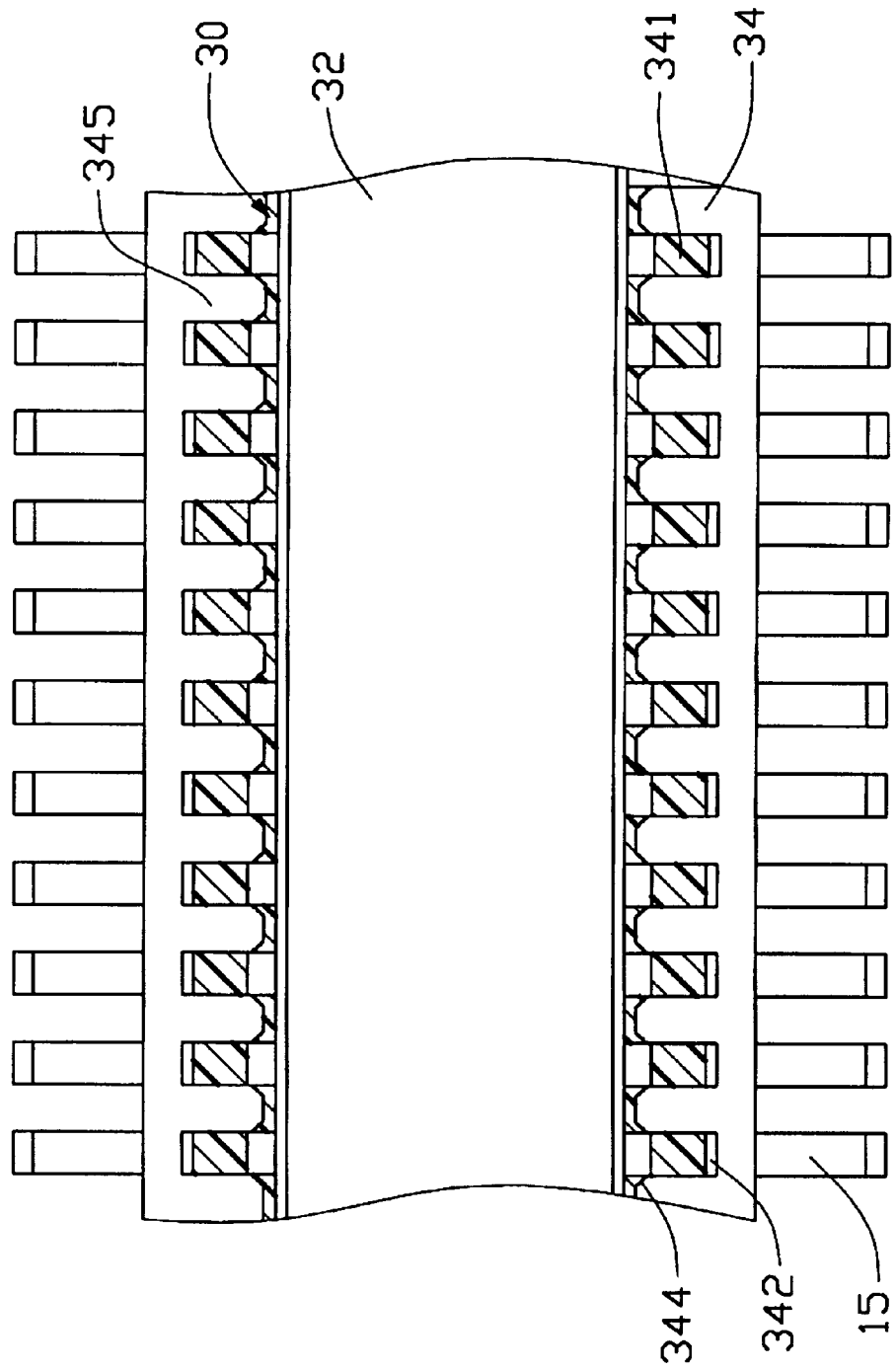
FIG. 4 is a partial cross-sectional view taken along line 4—4 of FiG. 2.
Figure 5:
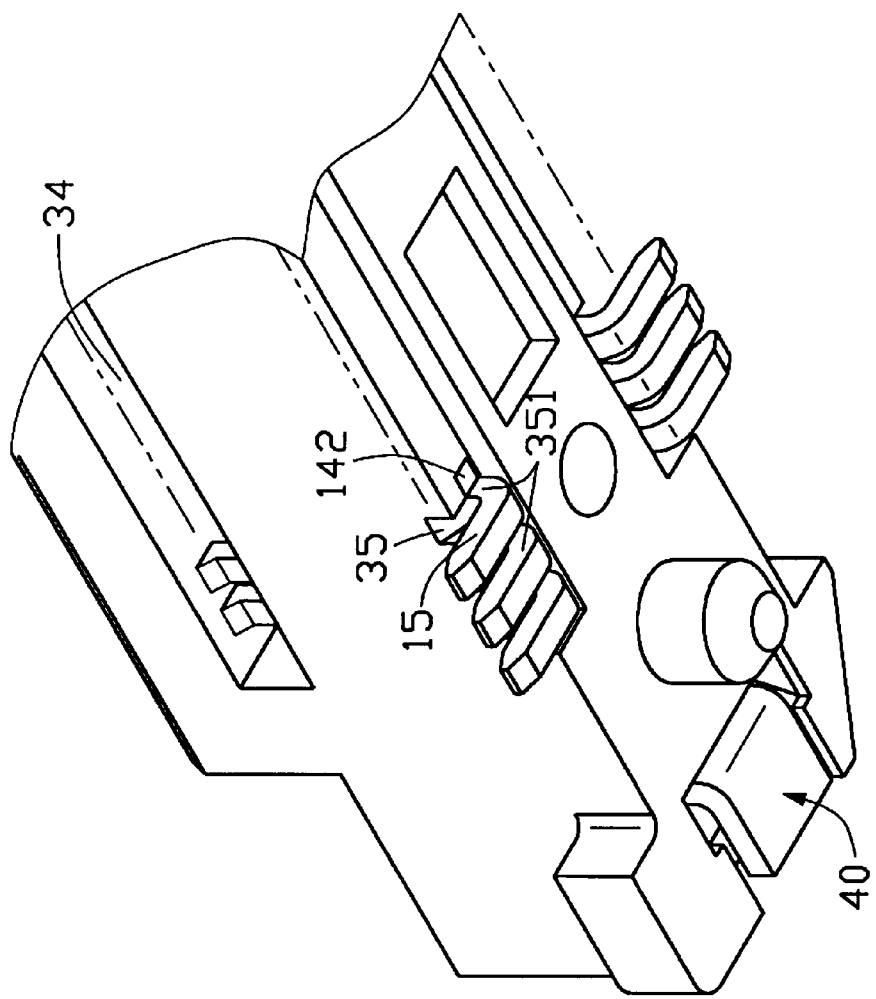
FIG. 5 is a partial perspective view of the connector of FIG. 2 taken from a different angle.

Also referring to FIGS. 3–5, a plurality of upwardly exposed openings 33 is formed in each side wall 31 proximate and in alignment with the corresponding terminals 10. An arcuate surface 331 is formed on an inner surface of each opening 33 proximate the mating surface 301 and adjacent to an outer surface of the corresponding side wall 31. A pair of inclined inner surfaces 332 is formed in each opening 33. An elongate groove 34 is defined in the outer surface of each side wall 31. A plurality of ribs 341 is disposed in the elongate groove 34 in alignment with the corresponding openings 33. Each rib 341 has a pair of outwardly inclined surfaces 342 formed on opposite ends thereof. A channel 345 is defined between each pair of adjacent ribs 341 terminating at a U-shaped surface 344. A plurality of holes 35 is defined in each side wall 31 and exposed to the connecting surface 302 for extension of the solder tails 15 of the terminals 10 therethrough. A recess 351 is formed between each pair of adjacent holes 35. An upper surface of each recess 351 is coplanar with bottom surfaces 142 of the lower barbs 141 of each terminal 10.

Figure 6:
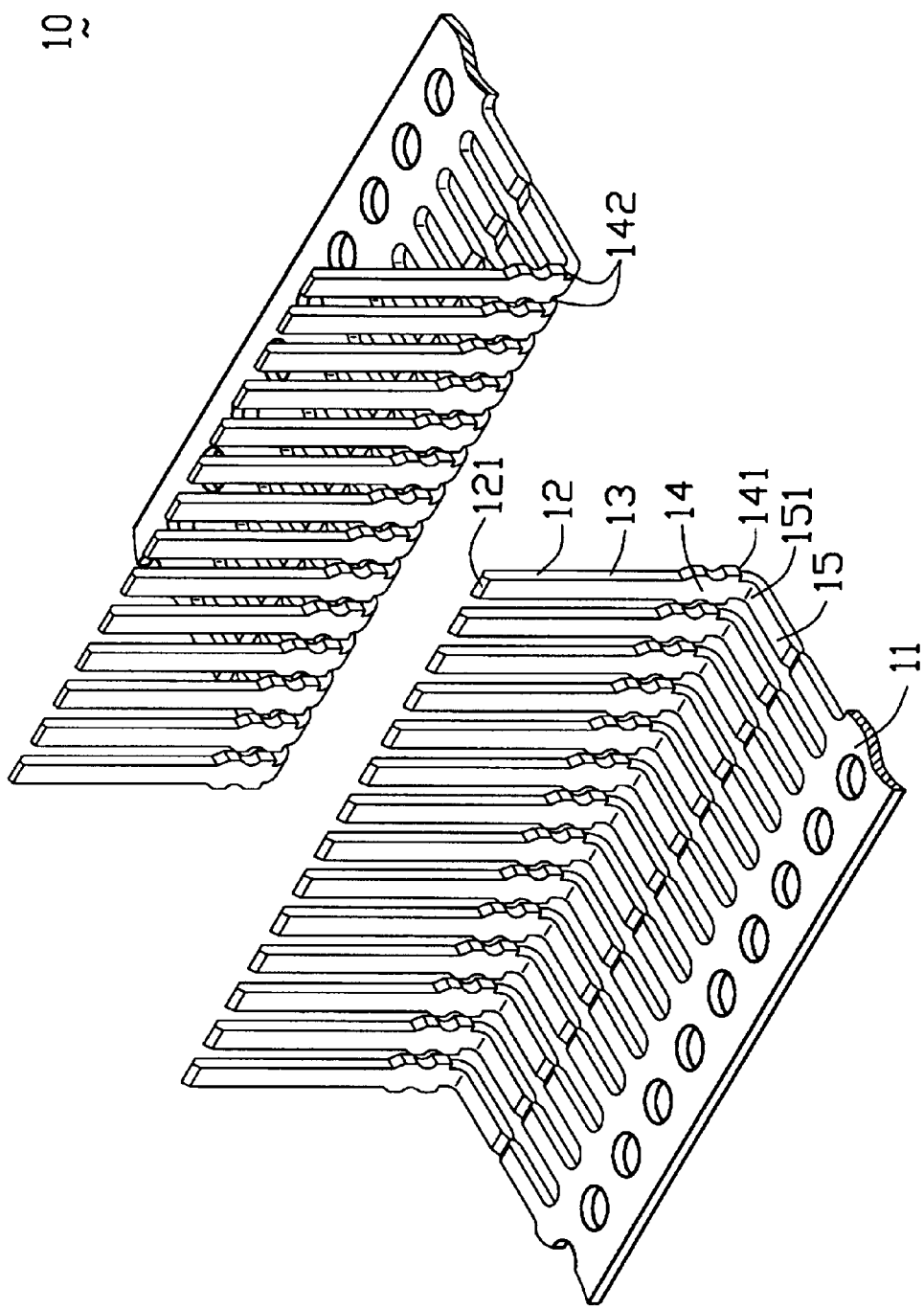
FIG. 6 is a perspective view of two rows of terminals attached to strip carriers prior to insertion into a mold assembly.
Figure 7:
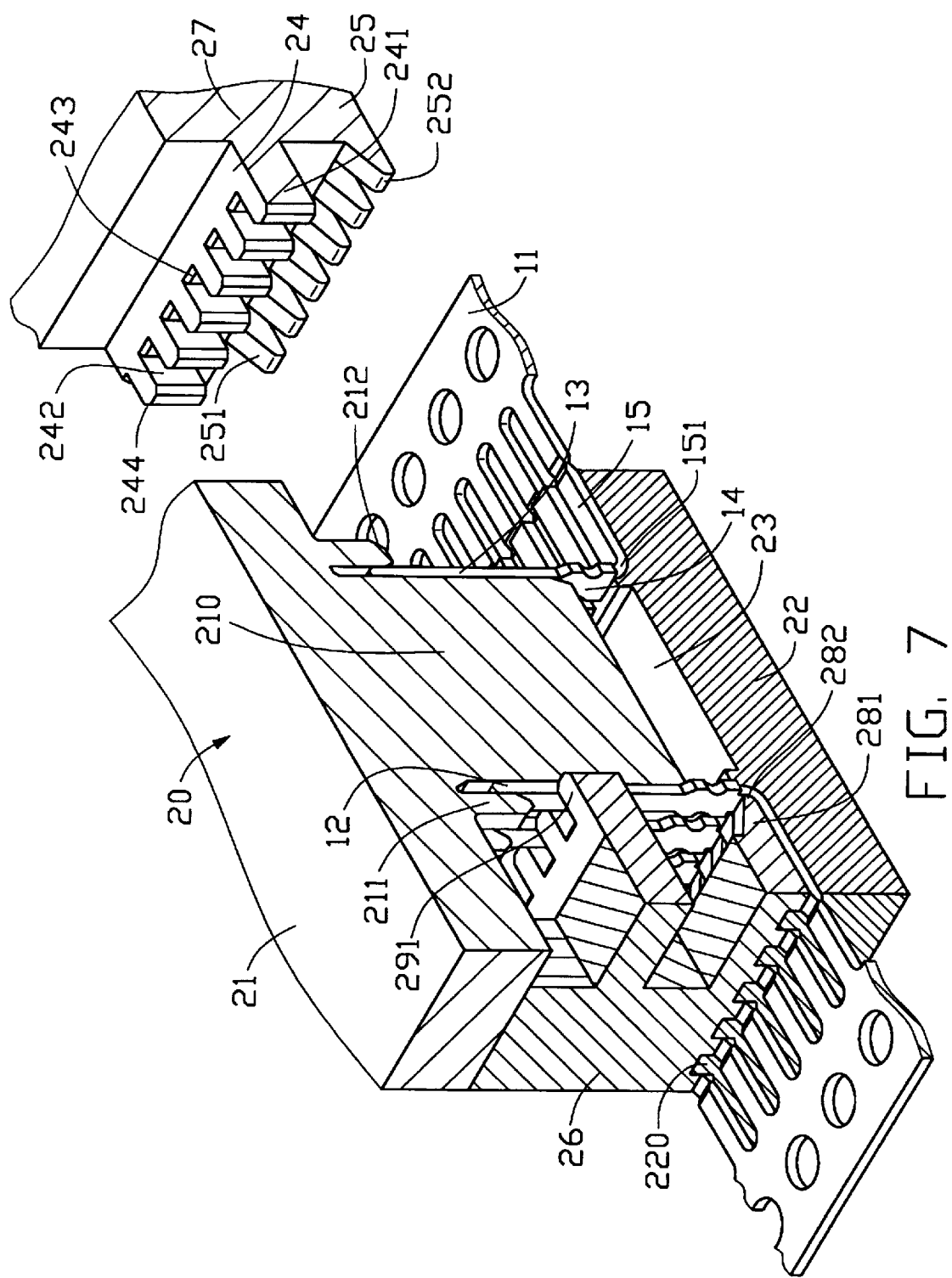
FIG. 7 is a cross-sectional view of the mold assembly with the two rows of terminals retained therein prior to an injecting process.
Figure 8:
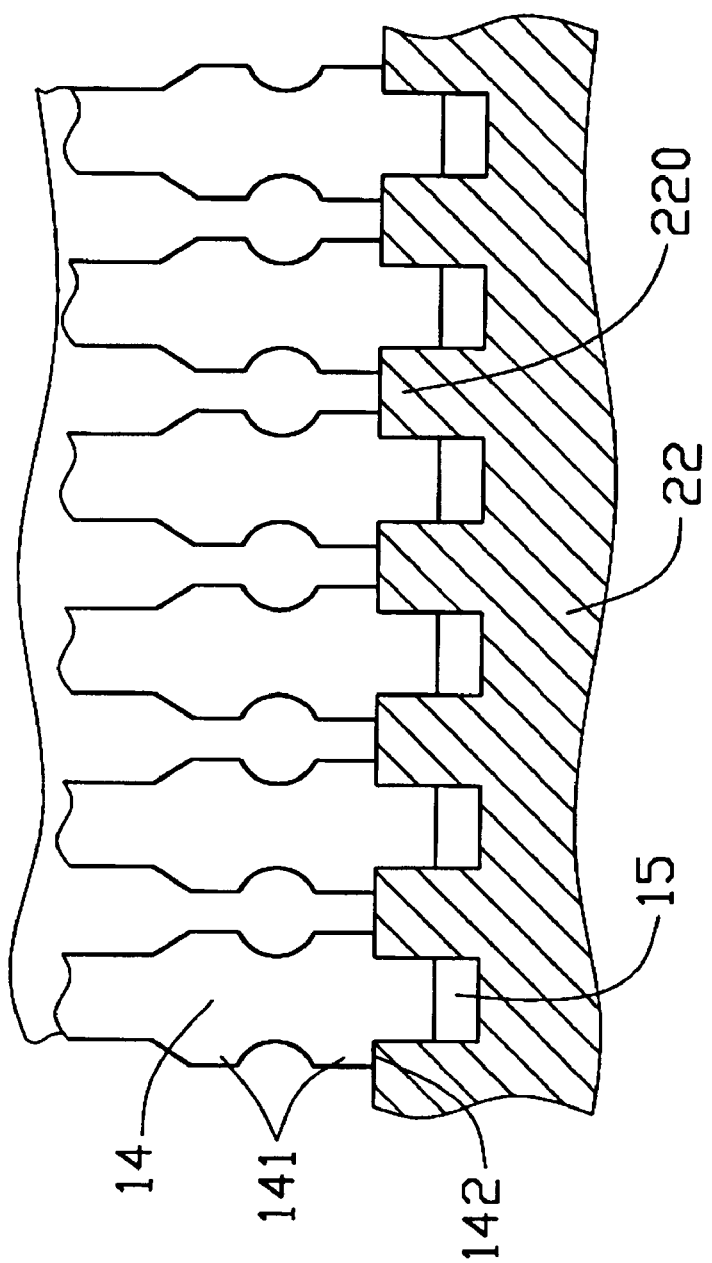
FIG. 8 is a fragmentary view showing the relationship between the terminals and a lower mold of the mold assembly.

As shown in FIGS. 6 through 8, a method for forming the connector 3 is also provided by the present invention. Two rows of the stamped and formed terminals 10 attached to carrier strips 11 are positioned in a mold assembly 20 in a back-to-back relationship. The mold assembly 20 consists of an upper mold 21, a lower mold 22 and a pair of symmetrically disposed left and right side molds 26, 27. Since the side molds 26, 27 have identical configurations, only the right side mold 27 will be described in detail.

The upper mold 21 has a protruding portion 210 for forming the slot 32 of the connector 3. A plurality of engaging posts 211 is formed on the upper mold 21 and arranged in two rows flanking the protruding portion 210. Each engaging post 211 forms the corresponding opening 33 of the housing 30 and has an arrowhead-shaped free end 212 for forming the inclined inner surfaces 332 of the corresponding opening 33. A reinforcing rib (not shown) is formed proximate the fixed end of the engaging post 211 and distanced from the protruding portion 210 for forming the arcuate surface 331 of the opening 33. The free end 212 and the reinforcing ribs enhance the rigidity of the engaging posts 211 thereby preventing deflection of the engaging posts 211 due to high pressure during molding.

The lower mold 22 has a plurality of strips 220 formed on an upper surface proximate opposite ends thereof. Each strip 220 forms the corresponding recess 351 of the housing 30.

The right side mold 27 comprises a central portion 24 for forming the elongate groove 34 of the housing 30 and a lower portion 25. The central portion 24 comprises a plurality of engaging ribs 241 for forming the channels 345 of the side wall 31 of the housing 30. Each engaging rib 241 has a chamfered free end 244 for forming the corresponding inner U-shaped surfaces 344 of the side wall 31. An engaging channel 242 is defined between each pair of adjacent engaging ribs 241 for forming the corresponding rib 341 of the housing 30. A pair of opposite chamfered surfaces 243 is formed on a bottom surface of each engaging channel 242 for forming the inclined surfaces 342 of the corresponding rib 341. Due to the chamfered free ends 244 and the chamfered surfaces 243, the rigidity of the right side mold 27 is increased. The lower portion 25 comprises a plurality of engaging fingers 251 spaced from each other a distance substantially equal to the width of the corresponding strip 220 of the lower mold 22. Each engaging finger 251 has a curved free end 252 which forms the corresponding hole 35 of the housing 30.

During molding, the left and right side molds 26, 27 are joined with the lower mold 22 with the two rows of terminals 10 retained therebetween in a back-to-back relationship. The tail portions 15 of the terminals 10 are sandwiched between the engaging fingers 281, 251 of the side molds 26, 27 and the lower mold 22. Thus, not only is vertical movement of the solder tails 15 of the terminals 10 prevented, but alignment between the solder tails 15 is also ensured. The curved free end 282, 252 of each engaging finger 281, 251 fittingly abuts against the transient section 151 of the corresponding terminal 10 thereby preventing plastic from being formed on the transient section 151 during molding. Each strip 220 abuts against the bottom surfaces 142 of the lower barbs 141 of the retention portions 14 of the adjacent terminals 10 thereby preventing the terminals 10 from moving in a longitudinal direction of the mold assembly 20. In addition, the strips 220 retain the engaging fingers 281, 251 of the molds 26, 27 in position. Thus, the tail portions 15 of the terminals 10 are prevented from moving in two directions, i.e. in a vertical direction and in a longitudinal direction of the mold assembly 20. Therefore, alignment between the tail portions 15 of the terminals 10 and the coplanarity thereof are ensured thereby facilitating soldering. The straight contact portions 13 of the terminals 10 are supported by the engaging ribs 291, 241 of the side molds 26, 27. Thus, movement of the contact portions 13 of the terminals 10 in a longitudinal direction of the mold assembly 20 is prevented thereby ensuring precise pitch thereof.

The upper mold assembly 20 is lowered onto the side molds 26, 27 whereby the protruding portion 210 thereof is inserted between opposite rows of the straight contact portions 13 of the terminals 10. A cavity 23 is defined between the protruding portion 210 of the upper mold 21 and the lower mold 22 for forming the base 39 of the housing 30. The end portion 12 of each terminal 10 is sandwiched between the corresponding engaging post 211 and a side surface of the protruding portion 210 of the upper mold 21 thereby preventing the end portions 12 from moving in a transverse direction of the mold assembly 20. Thus, the terminals 10 are fixedly retained in the mold assembly 20 at the tail portions 15, the contact portions 13 and the end portions 12. Under these conditions, molten plastic is injected into the mold assembly 20 for molding the housing 30. Thus, the electrical connector 3 having a precise pitch, as shown in FIG. 2, is obtained by cutting the carrier strips 11.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. An electrical connector comprising:
    an insulative housing having a base, a pair of side walls and a pair of retention blocks formed on opposite ends thereof, each side wall defining a plurality of upwardly exposed openings in a top surface thereof, an elongate groove in an outer surface thereof substantially extending the length of the side wall, a plurality of holes exposed to a bottom surface thereof and a plurality of downwardly exposed recesses between each pair of adjacent holes, the elongate groove having a plurality of ribs formed therein, each pair of adjacent ribs defining a channel therebetween; and
    a plurality of terminals insert molded in the insulative housing, each terminal comprising a straight contact portion, an end portion formed on one end thereof, a solder tail formed on an opposite end thereof and a retention portion interconnecting the contact portion and the solder tail, the straight contact portion abutting against the corresponding ribs of the housing, the end portion being engaged with the corresponding side wall proximate to and in alignment with the corresponding opening of the housing, the retention portion being securely embedded in the housing, the solder tail being received in corresponding hole of the housing and outwardly extending therefrom for being soldered to a printed circuit board, the solder tail having a transient section interconnecting the solder tail with the retention portion; wherein the housing is formed by the steps of:
    positioning a row of terminals on a lower mold, the lower mold having a plurality of strips formed on an upper surface thereof arranged in two arrays proximate opposite ends thereof to form corresponding downwardly exposed recesses of the housing, each strip being disposed between each pair of adjacent solder tails of the terminals for preventing the solder tails from moving in a longitudinal direction of the lower mold during molding;
    attaching a side mold to the lower mold, the side mold including a central portion and a lower portion, the central portion having a plurality of spaced engaging ribs to form corresponding channels of the elongate groove of the housing, each pair of adjacent engaging ribs defining an engaging channel therebetween for retaining the straight contact portions of the terminals in position thereby preventing the straight contact portions from moving in a longitudinal direction of the side mold during molding, the engaging channels forming corresponding ribs of the elongate groove of the housing, the lower portion of the side mold having a plurality of spaced engaging fingers to form corresponding holes of the housing, the engaging fingers together with the lower mold retaining the solder tails of the terminals therebetween thereby preventing the solder tails of the terminals from moving in a vertical direction of the side mold during molding;
    setting an upper mold over the side mold, the upper mold having a protruding portion and two rows of engaging posts formed adjacent to opposite sides of the protruding portion to form corresponding upwardly exposed openings of the housing, the protruding portion being inserted between rows of the straight contact, portions of the terminals, the end portions of the terminals being sandwiched between the corresponding engaging posts and a side surface of the protruding portion to prevent the end portions of the terminals from moving in a transverse direction of the side mold during molding; and
    injecting molten plastic within the assembled molds around the terminals to form the housing.

2. The electrical connector as described in claim 1, wherein each opening of the housing has an arcuate surface proximate the top surface and adjacent to an outer surface of the corresponding side wall, the arcuate surface being formed by a reinforcing rib formed proximate corresponding engaging post and distanced from the protruding portion of the upper mold to enhance the rigidity of the engaging post.

3. The electrical connector as described in claim 1, wherein each opening of the housing has inclined surfaces on a bottom portion thereof, the inclined surfaces being formed by an arrowhead-shaped free end of corresponding engaging post of the upper mold to enhance the rigidity of the engaging post.

4. The electrical connector as described in claim 1, wherein each rib of the elongate groove has a pair of outwardly inclined surfaces on opposite ends thereof, the pair of outwardly inclined surfaces being formed by a pair of opposite chamfered surfaces formed on a bottom surface of the engaging channel of the side mold to enhance the rigidity of the central portion of the side mold.

5. The electrical connector as described in claim 1, wherein each side wall has inner U-shaped surfaces, each channel terminating at the corresponding inner U-shaped surface, the U-shaped surface being formed by a chamfered free end of corresponding engaging rib of the side mold which enhances the rigidity of the engaging rib.

6. The electrical connector as described in claim 1, wherein the retention portion of the terminal has barbs formed on opposite sides thereof, and the positioning step comprises abutting the strips of the lower mold against bottom surfaces of the lower barbs of the terminals to retain the terminals in position.

7. The electrical connector as described in claim 1, wherein the transient section of each solder tail is received in corresponding hole of the housing, which is ensured by fittingly abutting a curved free end of the engaging finger of the side mold against corresponding transient section of the terminal to prevent plastic from being formed on the transient section during the attaching step.

* * * * *